United States Patent [19]
Lim et al.

[11] Patent Number: 5,884,024
[45] Date of Patent: Mar. 16, 1999

[54] SECURE DHCP SERVER

[75] Inventors: Swee B. Lim, Cupertino; Sanjay R. Radia, Fremont; Thomas K. Wong, Pleasanton; Panagiotis Tsirigotis, Mountain View; Robert J. Goedman, Palo Alto, all of Calif.

[73] Assignee: Sun Microsystems, Inc., Palo Alto, Calif.

[21] Appl. No.: 763,068

[22] Filed: Dec. 9, 1996

[51] Int. Cl.$^6$ .................................................. G06F 11/00
[52] U.S. Cl. ..................................... 395/187.01; 395/726
[58] Field of Search ......................... 395/200.68, 200.69, 395/200.7, 200.71, 200.72, 20.73, 200.74, 200.75, 200.55, 200.47, 200.48, 200.49, 186, 187.01, 188.01, 600, 726, 727, 728; 380/3, 4, 23, 25

[56] References Cited

U.S. PATENT DOCUMENTS 5,598,536  1/1997  Slaughter, III et al. ........... 395/200.49
5,684,951  11/1997  Goldman et al. .................. 395/188.01

OTHER PUBLICATIONS

Bradner, Network Working Group, RFC:1752, Jan. 1995, Cover pp. 28–29.
Bob Schoettle, "IP–Address Management on LANs," Feb. 21, 1996, BYTE, vol. 21, No. 2, XP000549786, pp. 199 and 200.
Daniel M. Gasparro, "IP Addressing: Plan or Pay," Data Communications, vol. 25, No. 12, Sep. 1996, XP 000626549, pp. 59–62, 64 and 66.
R. Droms, "Dynamic Host Configuration Protocol", *RFC 1541*, Bucknell University, Oct. 1993.

*Primary Examiner*—Robert W. Beausoliel, Jr.
*Assistant Examiner*—Nadeem Iqbal
*Attorney, Agent, or Firm*—Graham & James LLP

[57] ABSTRACT

A preferred embodiment of the present invention includes a method and apparatus for allocating and using IP addresses in a network of client systems. More specifically, the present invention includes a DHCP server that leases IP addresses to the client systems. The DHCP server works in combination with a secure DHCP relay agent and a secure IP relay agent. Broadcast DHCPREQUEST messages are forwarded to the DHCP server by the secure DHCP relay agent. Before forwarding, the secure DHCP relay agent embeds in each DHCPREQUEST message. The trusted identifier is an unforgeable object specifically associated with the client system sending the DHCPREQUEST message. When the DHCP server receives a DHCPREQUEST message, the DHCP server extracts the trusted identifier. The trusted identifier is then used by the DHCP server to prevent client systems from accessing the IP address leases of other client systems. The DHCP server also counts the number of IP addresses leases assigned to each trusted identifier. In this way, each client system is prevented from leasing more than a predetermined number of IP addresses. Unicast DHCPREQUEST messages received by the DHCP server include a source address that corresponds to the client system sending the unicast DHCPREQUEST message. The validity of the source address is ensured by the secure IP relay agent. The DHCP server uses the source address to prevent client systems from accessing the IP address leases of other client systems.

21 Claims, 7 Drawing Sheets

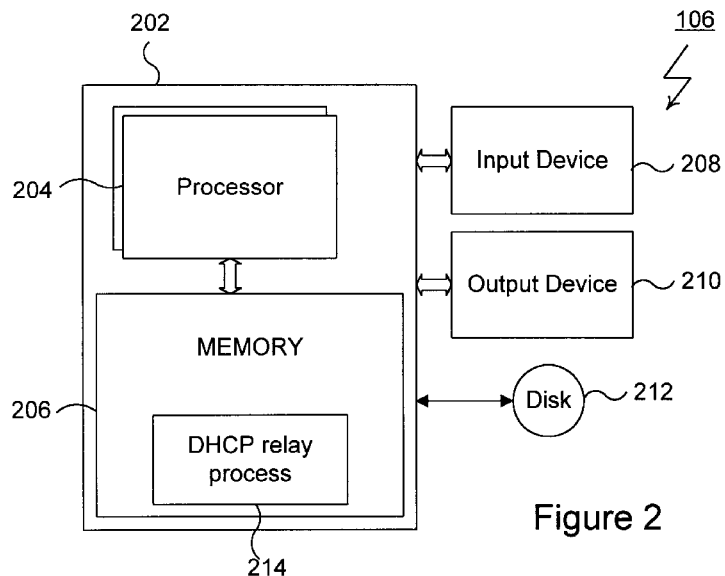
Figure 2
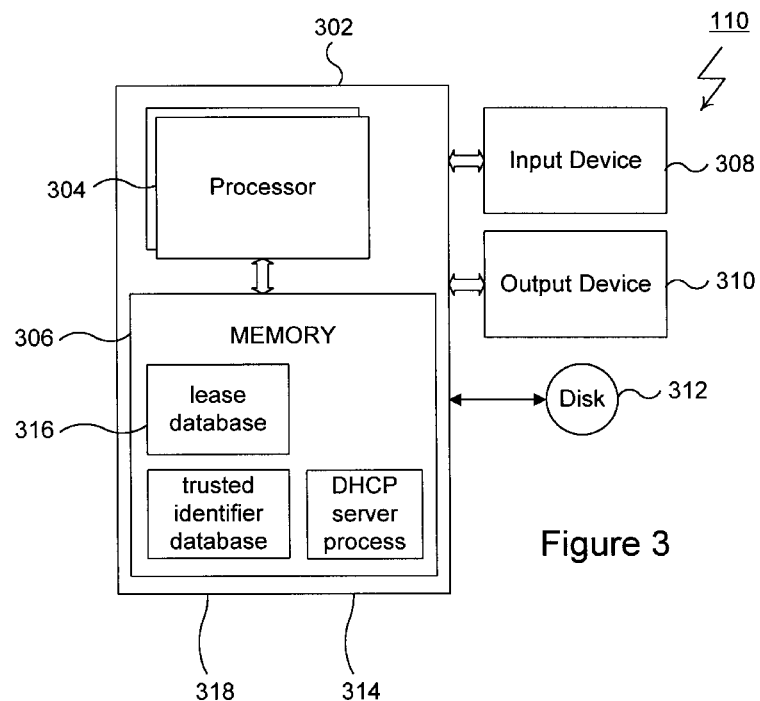
Figure 3
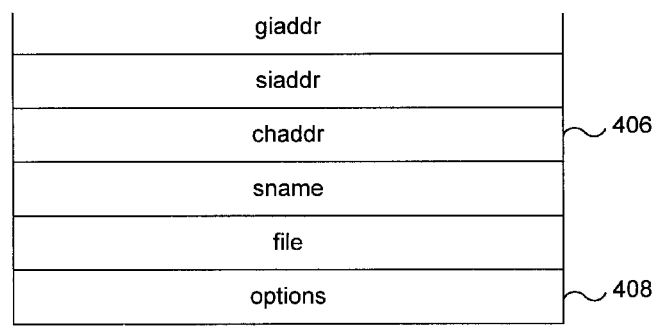

5,884,024

SECURE DHCP SERVER

RELATED APPLICATIONS

The following co-pending patent applications, which were filed on Dec. 9, 1996, are related to the subject application and are herein incorporated by reference:

1. Application Ser. No. 08/763,234, entitled "Method and Apparatus for Client-Sensitive Name Resolution Using DNS" of Swee Boon Lim, Sanjay R. Radia, and Thomas Wong and Michael W. Patrick.
2. Application Ser. No. 08/762,393, entitled "Method and Apparatus for Access Control in a Distributed Multiserver Network Environment" of Thomas Wong, Sanjay R. Radia, Swee Boon Lim, Panagiotis Tsirigotis, and Rob Goedman.
3. Application Ser. No. 08/762,402, entitled "Method and Apparatus for Dynamic Packet Filter Assignments" of Sanjay R. Radia, Swee Boon Lim, Panagiotis Tsirigotis, Thomas Wong, and Rob Goedman.
4. Application Ser. No. 08/763,289, entitled "Load Balancing and Failover of Network Services" of Swee Boon Lim, Ashish Singhai, and Sanjay R. Radia.
5. Application Ser. No. 08/763,212, entitled "A Method to Activate Unregistered Systems in a Distributed Multiserver Network Environment" of Thomas Wong and Sanjay R. Radia.
6. Application Ser. No. 08/762,709, entitled "A Method and Apparatus for Assignment of IP Addresses" of Thomas Wong, Swee Boon Lim, Sanjay R. Radia, Panagiotis Tsirigotis, and Rob Goedman and Michael W. Patrick.
7. Application Ser. No. 08/762,933, entitled "A Method for Using DHCP to Override Learned IP Addresses in a Network" of Sanjay R. Radia, Thomas Wong, Swee Boon Lim, Panagiotis Tsirigotis, Rob Goedman, and Mike Patrick.
8. Application Ser. No. 08/762,705, entitled "Dynamic Cache Preloading Across Loosely Coupled Administrative Domains" of Panagiotis Tsirigotis and Sanjay R. Radia.

The following co-pending patent application is related to the subject application and is herein incorporated by reference:

9. U.S. Application Ser. No. 08/673,951, filed Jul. 1, 1996, entitled "A Name Service for a Redundant Array of Internet Servers" of Swee Boon Lim.

FIELD OF THE INVENTION

The present invention relates generally to security in computer networks. More specifically, the present invention is a method and apparatus for reducing the probability of IP address misuse among the clients of a DHCP server.

BACKGROUND OF THE INVENTION

Computer networks that use the Internet protocol are commonly referred to as "IP networks." Within IP networks, host systems and other objects are identified by thirty-two bit numbers, known as Internet Protocol Addresses (IP addresses). IP addresses provide a simple mechanism for identifying the source and destination of messages sent within IP networks.

Increasingly, IP addresses within IP networks are assigned using the Dynamic Host Configuration Protocol (DHCP) defined in Internet RFC 1541 which is incorporated herein by reference. In networks that use the DHCP protocol, client systems request IP addresses from a DHCP server. The DHCP server allocates an IP address for use by the requesting client system and sends the client a message telling the client system which IP address to use.

The IP address allocated by the DHCP server is "leased" to the client system for a fixed period of time. Subsequently, the client system is responsible for periodically renewing the lease of the IP address. The client system and the DHCP server use an object known as a lease identification cookie to identify the client's lease. The client system may choose the lease identification cookie by sending the DHCP server a client identifier. Alternatively, the DHCP server uses the client system's IEEE-style MAC address as the lease identification cookie. The client system periodically renews its lease by sending a lease renewal message to the DHCP server that includes the lease identification cookie.

Unfortunately, allocation of IP addresses using traditional DHCP servers is subject to several possible attacks. One such attack is known commonly as "IP address hijacking." IP address hijacking occurs when a first client system acquires the IP address of a second client system. The first client maintains the hijacked IP address by sending lease renewal messages to the DHCP server using the second client system's lease identification cookie. In fact, since host names are commonly used as lease identification cookies, it is even possible for this type of attack to happen inadvertently. IP address hijacking confuses the network since a single IP address is now used by more than one host. As a result, network performance is degraded.

A second type of attack is known as "IP address hogging." For an attack of this type, a client system attempts to exhaust the supply of IP addresses by repeatedly obtaining IP leases from the DHCP server. Once the client system has leased all of the available IP address leases, network performance degrades as legitimate users are forced to wait for IP addresses.

Based on the foregoing, it may be appreciated that there is a need for DHCP servers that discourage both IP address hijacking and IP address hogging.

SUMMARY OF THE INVENTION

A preferred embodiment of the present invention includes a method and apparatus for allocation of IP addresses that discourages IP address misuse. More specifically, a preferred environment for the present invention is a computer network that includes a series of client systems. Each client system is connected to a corresponding cable modem that is connected, in turn, to a router. The router forwards packets between the client systems and one or more server systems. The network includes one or more DHCP server systems that provide for allocation of IP addresses in accordance with the Dynamic Host Configuration Protocol (DHCP) defined in Internet RFC 1541.

The network also includes a secure DHCP relay agent that forwards DHCP messages between the client systems and the DHCP servers. In some cases, the secure DHCP relay agent will be included in the router. In other cases, it may be preferably to include the secure DHCP relay agent as a separate network component. The secure DHCP relay agent monitors IP packets within the network and detects DHCP broadcast messages. When a DHCP broadcast message is detected, the secure DHCP relay agent encodes a "trusted identifier" within the vendor-specific information of the DHCP broadcast message. The trusted identifier is an unforgeable value that is associated with the source of the DHCP broadcast message. In a preferred embodiment of the present invention, the trusted identifier is the modem id of the cable modem that connects the client system sending the DHCP broadcast message to the router.

Within the network, the cable modems and the cable router act as a secure IP relay agent. Working with the secure DHCP relay agent, the secure IP relay agent monitors allocation of IP addresses by the DHCP server to the client systems. After allocation of an IP address to a client system, the secure IP relay agent discards all IP packets originating from the client system that do not include the assigned IP address. In this fashion, the secure IP relay agent prevents the client systems from sending IP packets with forged source addresses.

As used in a preferred embodiment of the present invention, the DHCP server includes a lease database having a lease identifier index and an IP address index. Each entry in the lease identifier index is a combination of a lease identification cookie and a trusted identifier. Each entry in the IP address index is an IP address. Each record in the lease database is an IP address lease. The DHCP server also includes a trusted identifier database. The trusted identifier database has a single index with each entry in the index being a trusted identifier. Each record in the trusted identifier database is one or more IP address leases.

Broadcast DHCP messages that reach the DHCP server pass first through the secure DHCP relay agent. The broadcast DHCP messages are then unicast to the DHCP server. As a result of passing through the DHCP relay agent, each DHCP message reaching the DHCP server includes the trusted identifier embedded by the secure DHCP relay agent. When the DHCP server receives a DHCP message, it first examines the message to determine if it is a message type that requires access to an existing IP address lease. If so, the DHCP server extracts the trusted identifier and lease identification cookie included in the message. The trusted identifier and lease identification cookie are then combined to retrieve the existing lease from the lease database (using the lease identifier index of the lease database). In this way, a client system is prevented from accessing IP address leases that are not associated with the client system's trusted identifier. In particular, client systems may only renew their own leases.

Before a lease is granted, the DHCP server uses the trusted identifier to query the trusted identifier database. If the trusted identifier database includes a record corresponding to the trusted identifier, the record is retrieved. Alternatively, if the trusted identifier database does not include a record corresponding to the trusted identifier then the DHCP server creates a new record. The new record includes no IP address leases. Using the retrieved or new record, the DHCP server tabulates the number of IP address leases assigned to the trusted identifier. If this number exceeds a preset limit, the DHCP server does not grant the requested IP address lease. In this way, the DHCP server prevents a single client system from obtaining an inordinate number of IP address leases. If an IP address lease is granted, the DHCP server adds the new lease to the record corresponding to the trusted identifier.

Unicast DHCP messages that reach the DHCP server do not pass through the secure DHCP relay agent. As a result, the trusted identifier is not included in unicast DHCP messages. When the DHCP server receives a message of this type, it extracts the source address included in the message (the source address is actually extracted from the IP packet or packets that comprise the IP message). The extracted source IP address is then used to retrieve the IP address lease in question from the lease database (using the IP address index of the lease database). Since the secure IP relay agent ensures unforgeability of the source address of the unicast DHCP message, a client system is prevented from accessing the IP address leases of other client systems. In particular, client systems may only renew their own leases.

Advantages of the invention will be set forth, in part, in the description that follows and, in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 2 is a block diagram of a router as used by a preferred embodiment of the present invention.

FIG. 3 is a block diagram of a DHCP server used by a preferred embodiment of the present invention.

DETAILED DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

Figure 1:
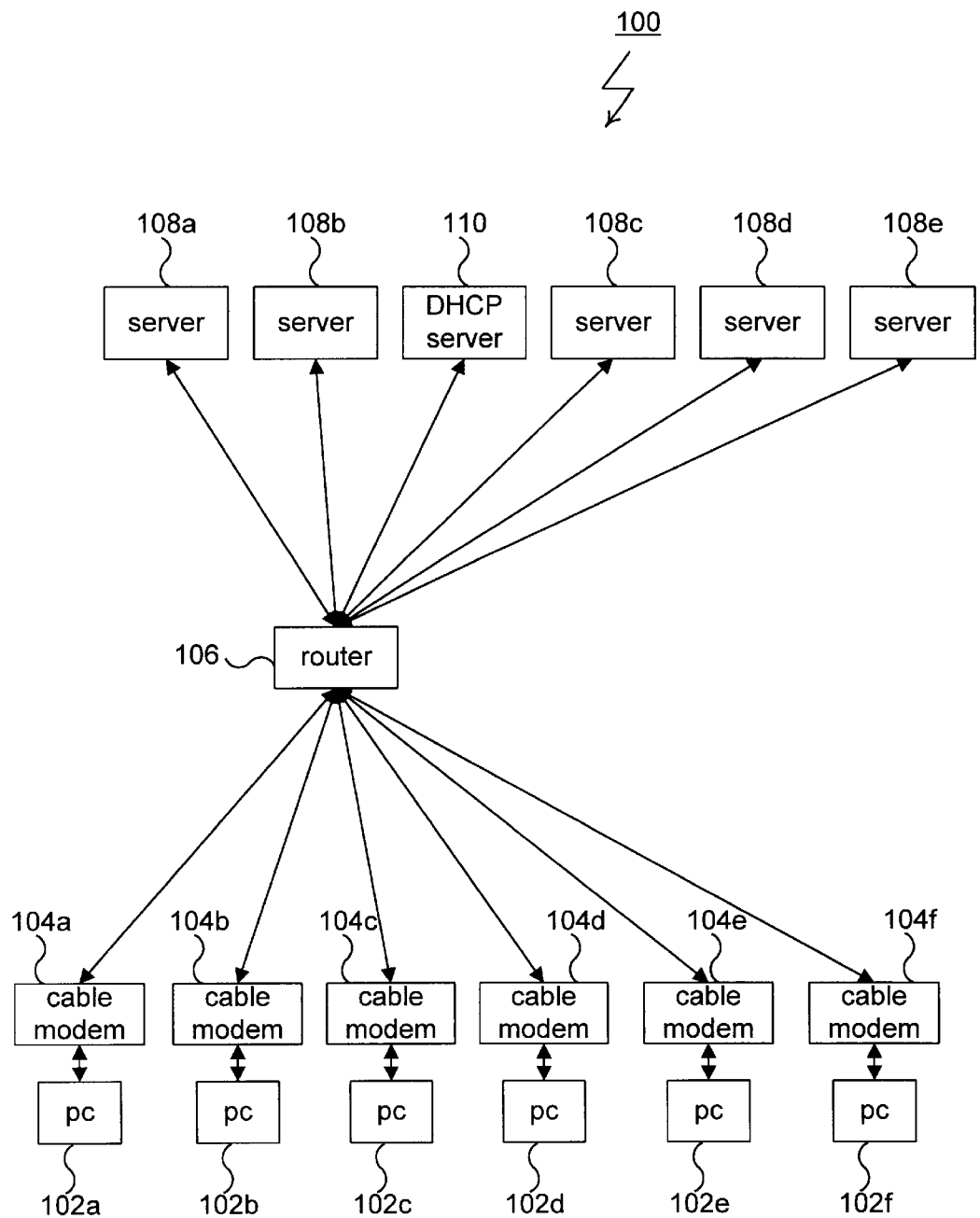
FIG. 1 is a block diagram of a computer network shown as a representative environment for a preferred embodiment of the present invention.

FIG. 1 shows a computer network 100 as a representative environment for the present invention. Structurally, computer network 100 includes a series of client systems 102, of which client systems 102a through 102f are representative. Each client system 102 may be selected from a range of differing devices including, but not limited to, the personal computers shown in FIG. 1. A cable modem 104 is connected to each client system 102. Each cable modem 104 is connected, in turn, to a cable router 106. Cable router 106 is connected to a series of server systems 108, of which server systems 108a through 108e are representative. The use of cable router 106 and cable modems 104 is also intended to be exemplary, and it should be appreciated that other networking technologies and topologies are equally practical. It should also be appreciated that a number of different cable modems and cable routers are available from various manufactures. In particular, cable modem 104 can be a cable modem sold by Motorola, Inc., under the trademark "CYBERSUFR" and cable router 106 can be a cable router sold by Motorola, Inc., under the trademark "CABLE-MASTR."

Router 106 is shown in more detail in FIG. 2 to include a computer system 202 that, in turn, includes a processor, or processors 204, and a memory 206. An input device 208 and an output device 210 are connected to the computer system 202 and represent a wide range of varying I/O devices such as disk drives, keyboards, modems, network adapters, printers and displays. A disk drive 212, of any suitable disk drive type, is shown connected to computer system 202. A DHCP relay process 214 is shown to be resident in memory 206 of computer system 202.

A DHCP server system 110 is also included in computer network 100 and connected to cable router 106. DHCP server system 110 is a computer or other system that implements Dynamic Host Configuration Protocol (DHCP) defined in Internet RFC 1541. DHCP server system 110 is shown in more detail in FIG. 3 to include a computer system 302 that, in turn, includes a processor, or processors 304, and a memory 306. An input device 308 and an output device 310 are connected to the computer system 302 and represent a wide range of varying I/O devices such as disk drives, keyboards, modems, network adapters, printers and displays. A disk drive 312, of any suitable disk drive type, is shown connected to computer system 302. A DHCP server process 314, lease database 316 and trusted identifier database 318 are shown to be resident in memory 306 of computer system 302.

Figure 4:
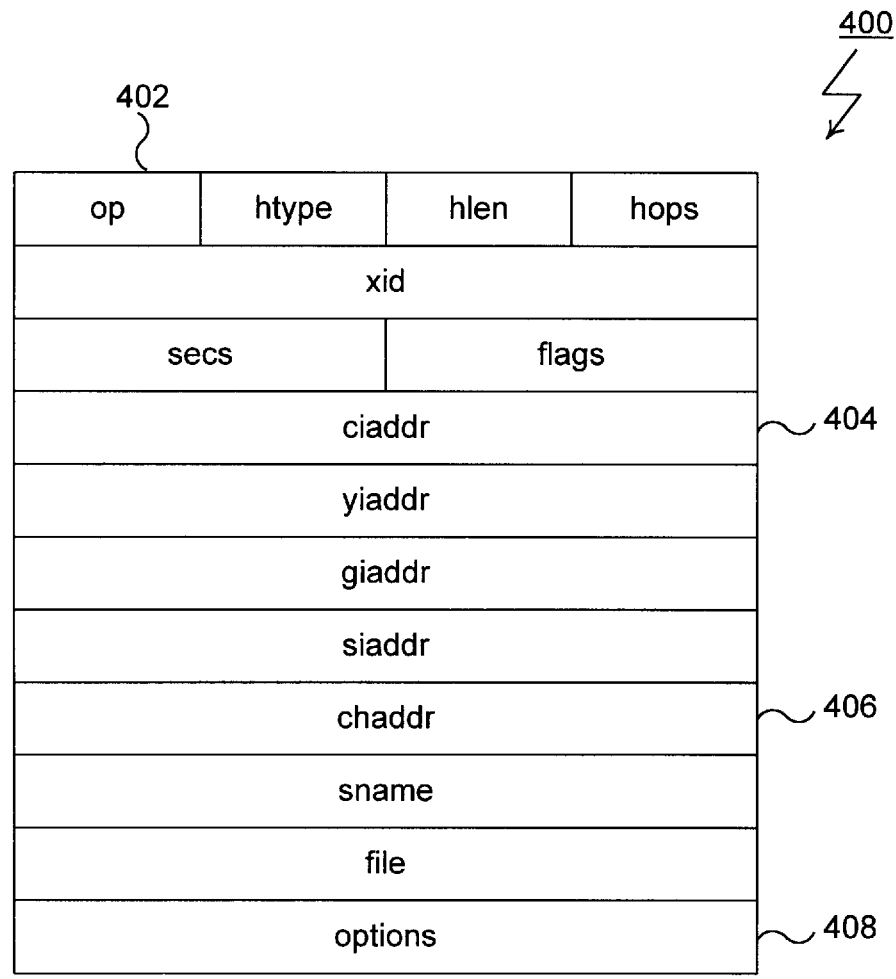
FIG. 4 is a block diagram of the DHCP message format used by a preferred embodiment of the present invention.

Client systems 102 and DHCP server system 110 communicate using DHCP messages. A preferred format for these message is shown in FIG. 4 and generally designated 400. Structurally, DCHP message includes an op field 402 and an options field 408 (Examination of FIG. 4 shows that each message also includes a number of other fields. For the sake of brevity, these fields will not be discussed with particularity). Functionally, each DHCP message has a type, such as DHCPDISCOVER, DHCPOFFER, DHCPREQUEST or DHCPACK. The type of each DHCP message is encoded into the options field 408. The options field is also used for a number of other purposes, including the encoding of vendor-specific information. Each DHCP message is marked to indicate whether it is being sent from a client system 102 or a DHCP server system 110. This marking is performed by setting op 402 to BOOTREQUEST, or BOOTREPLY, respectively. Within a message, the ciaddr field 404 includes, for certain types of DHCP messages 400, an identifier that is being passed between a DHCP server system 110 and a client system 102. The chadddr field 406 is used for the machine address of a client system 102 (also known as a MAC address).

The combination of cable modems 104 and cable router 106 provides a "secure IP relay agent." Importantly, the secure IP relay agent ensures the validity of the source address included in the IP header of IP packets that originate at the client systems 102. More specifically, the secure IP relay agent "learns" the IP addresses that are assigned to each client system 102. When an IP packet is received from a client system 102, the source address of the IP packet is compared to the IP addresses learned by the secure IP relay agent. If the source address of the IP packet does not match the learned IP addresses, the IP packet is discarded. The use of IP address learning is more specificallydescribed in a copending U.S. patent application Ser. No. 08/762,709 entitled "Method and Apparatus for Assignment of IP Addresses," naming Wong et al., as inventors, the disclosure of which is incorporated herein by reference.

The DHCP relay process 214 included in router 106 provides a secure DHCP relay agent. The secure DHCP relay agent assures that a trusted identifier is included in each DHCP broadcast message that originates at any of the client systems 102. More specifically, a trusted identifier is a data object that specifically identifies a relay agent that is associated with a single client system 102. In the case of network 100, the cable modems 104 are relay agents that are specifically associated with single client systems 102. Preferably, each modem 104 includes a unique modem id. This modem id is used as the trusted identifier. When other networking technologies and topologies are used, other values or objects may be more suitably used as the trusted identifier.

Functionally, the trusted identifier may be used to identify the client system 102 that is the origin of an IP packet, as well as to specifically direct an IP packet to a specific client system 102. For a preferred embodiment of the present invention, the DHCP relay process 214 included in the router 106 encodes the trusted identifier into the vendor-specific information included in the options field 408 of each DHCP broadcast message. Since DHCP broadcast messages are processed by DHCP relay process 214 prior to being forwarded to DHCP server system 110, DHCP server system 110 is assured that each message of this type will include the correct trusted identifier. The use of trusted identifier encoding is also more specifically described in copending U.S. patent application Ser. No. 08/762,709 entitled "Method and Apparatus for Assignment of IP Addresses," naming Wong et al., as inventors.

Within network 100, DHCP server system 110 dynamically allocates IP addresses to client system 102. This allocation is performed in accordance with the DHCP protocol defined in Internet RFC 1541. IP addresses allocated in this fashion are "leased" by the client systems 102. Client systems 102 that do not periodically renew their leases are in danger of losing their allocated IP addresses. Each client system 102 uses a lease identification cookie to identify its lease to the DHCP server system 110. The client system 102 may choose the lease identification cookie by sending the DHCP server system 110 a client identifier. Alternatively, if the client system does not send a client identifier, the DHCP server system 110 uses the IEEE-style MAC address of the client system 102 as the lease identification cookie. The client system 102 renews its lease by sending a DHCP message to the DHCP server system 110 that includes the lease identification cookie.

DHCP server system 110 maintains IP address leases in lease database 316. Lease database 316 is more clearly shown in FIG. 5 to include one or more records 500, each of which includes an IP address lease. Preferably, lease database 316 includes one record 500 for each IP address that may be leased by the DHCP server system 110. Each record 500 is accessible using an IP address index 502. The entries in IP address index 502 correspond to IP addresses. Functionally, the IP address index 502 provides an apparatus that associates IP addresses with IP address leases.

Figure 5:
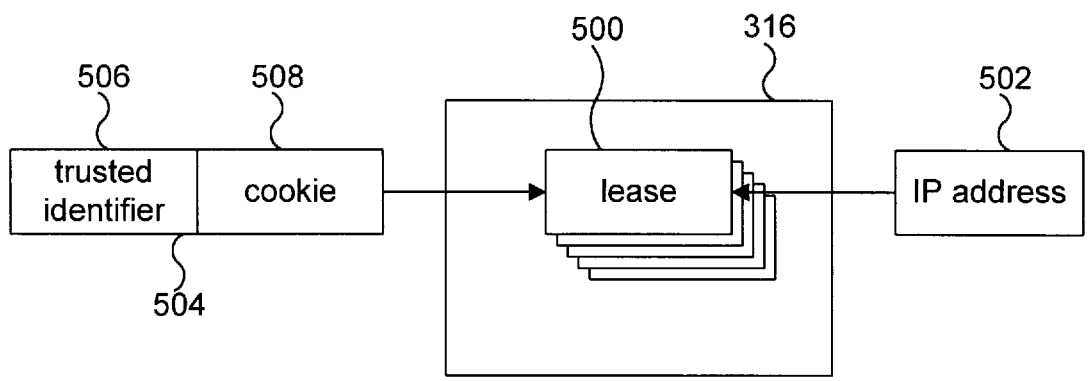
FIG. 5 is a block diagram of a lease database used in a preferred embodiment of the present invention.
Figure 6:
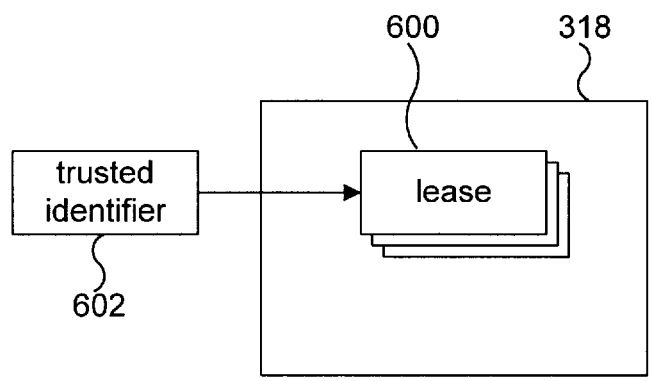
FIG. 6 is a block diagram of a trusted identifier database as used in a preferred embodiment of the present invention.

Records 500 in lease database 316 that include IP addresses leases that are, or have been, allocated to client system 102 are a accessible using lease identifier index 504. The entries in lease identifier index 504 correspond to lease identifiers that are combinations of trusted identifiers 506 and lease identification cookies 508. In FIG. 5, the combination of trusted identifier 506 and lease identification cookie 508 is shown as a concatenation. The use of concatenation is intended to be exemplary and other methods for combining trusted identifier 506 and lease identification cookie 508 into lease identifiers are equally practical. Functionally, the lease identifier index 504 provides an apparatus that associates lease identifiers with IP address leases. For the described embodiment, the records 500 that include IP addresses leases that have never been allocated to a client system 102 are not included in lease identifier index 504. Alternatively, these records 500 may be assigned to a special "unassigned" entry included in lease identifier index 504.

DHCP server system 110 also maintains a trusted identifier database 318. Trusted identifier database 318 includes one or more records 600. Each record 600 includes one or more leases and is accessible using a trusted identifier index 602. The entries in trusted identifier index 602 correspond to trusted identifiers. Functionally, trusted identifier index 602 provides an apparatus that allows IP address leases to be associated with trusted identifiers. Alternately, the trusted identifier database 318 may be eliminated by providing a trusted identifier index for lease database 316. Each entry in the trusted identifier index of lease database 316 corresponds to a particular trusted identifier and each entry may be used to retrieve the IP address leases associated with the particular trusted identifier.

Figure 7:
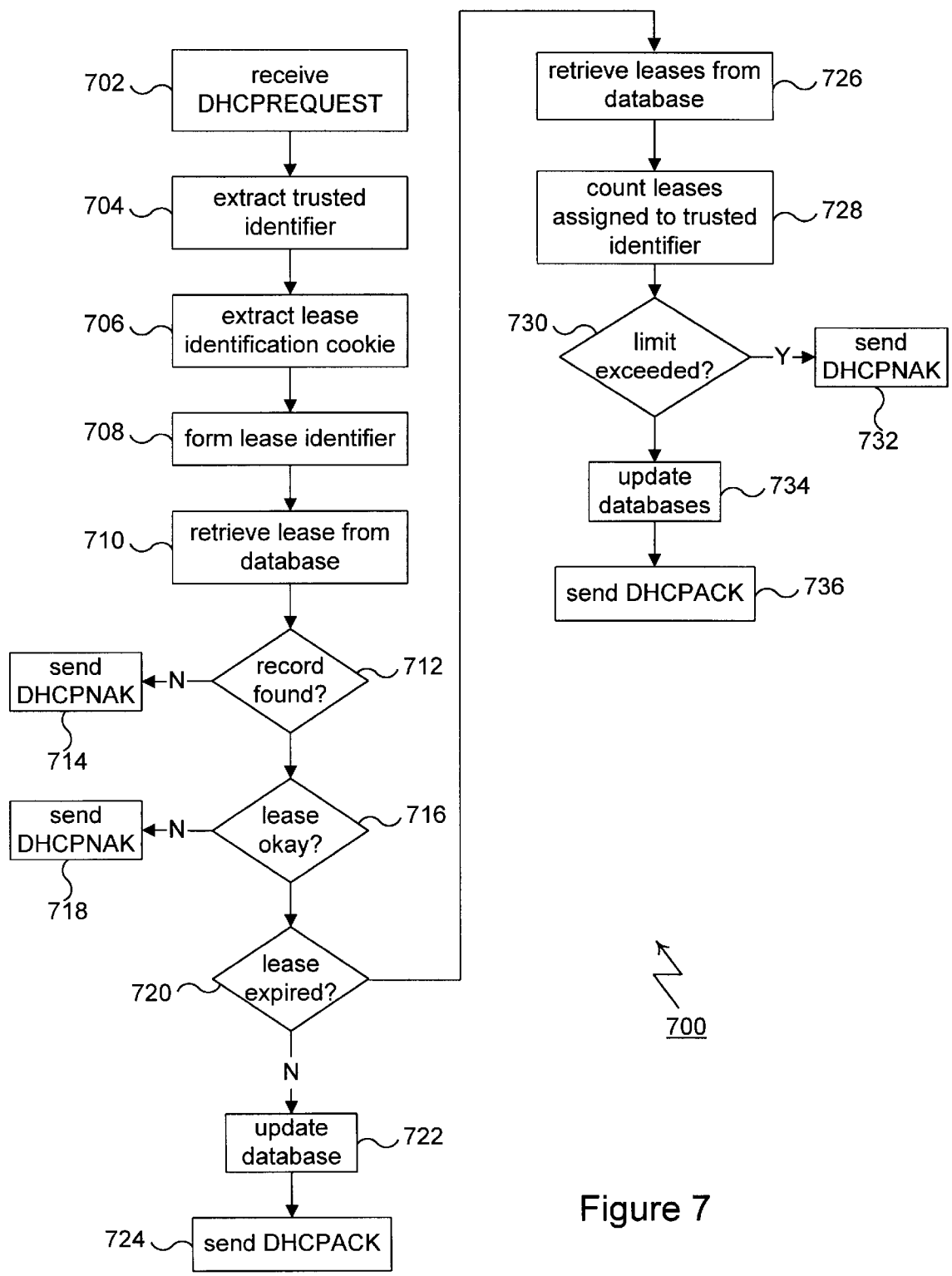
FIG. 7 is a flowchart showing the steps associated with a preferred embodiment of the IP address lease renewal method of the present invention.

A preferred method for renewal of an IP address lease by DHCP server system 110 is shown in FIG. 7 and generally designated 700. Method 700 begins with step 702 where DHCP server system 110 receives a broadcast DHCPREQUEST message from a client system 102. For the purposes of illustration, it is assumed that the DHCPREQUEST message does not identify a specific DHCP server 110. Thus, according to the DHCP protocol, the received message is a request from a client 102 for renewal of an existing lease.

In step 704, the DHCP server system 110 extracts the trusted identifier from the received message. More specifically, and as previously described, each broadcast DHCP message that reaches the DHCP server system 110 includes a trusted identifier. In step 704, this trusted identifier is retrieved, by the DHCP server 110, from the vendor-specific information included in the options field 408 of the received message.

The DHCP protocol allows the client system 102 to include a lease identification cookie in the ciaddr field 404 of each DHCPREQUEST message for lease renewal. Alternatively, if a lease identification cookie is not included the ciaddr field 404, the DHCP protocol requires that the contents of the chaddr field 406 be used as the lease identification cookie. In step 706, the DHCP server system 110 extracts the lease identification cookie from the ciaddr field 404 or the chaddr field 406 of the received message.

In step 708 the trusted identifier retrieved in step 704 and the lease identification cookie retrieved in step 706 are combined to create a lease identifier. Generally, the combining of the trusted identifier and the lease identification cookie may be performed by a number of techniques including, but not limited to, concatenation. The particular method for combination, must, however be compatible with the method used to generate the entries in the lease identifier index 504 of the lease database 316.

In step 710, the DHCP server system 110 uses the lease identifier generated in step 708 to retrieve a record 500 from lease database 316. More specifically, in step 710, the DHCP server system 110 searches lease identifier index 504 of lease database 316 for an entry that matches the lease identifier generated in step 708. When a matching entry is found, the corresponding record 500 in lease database 316 is retrieved. Alternatively, the search of lease database 316 terminates if no entry in lease identifier index 504 matches the lease identifier. Importantly, the search of lease database 316 using the combination of the trusted identifier and the lease identification cookie ensures that each client system 102 may only retrieve records 500 that are associated with the client system 102. Thus, client systems 102 may only access their own leases, regardless of the lease identification cookie included in the DHCPREQUEST message received in step 702.

Step 710 is followed by step 712 where the DHCP server system 110 analyzes the results of the search of lease database 316. If step 712 determines that the search of lease database 316 terminated without locating a record 500, execution of method 700 continues at step 714. In step 714, a DHCPNAK message is sent by the DHCP server system 110 to the client system 102 indicating that the DHCP server system 110 was unable to comply with the request to extend the IP address lease of the client system 102. Typically, step 714 will be executed when the client system 102 has attempted to extend a nonexistent or otherwise invalid IP address lease.

If step 712 determines that the search of lease database 316 located a record 500, execution of method 700 continues at step 716. In step 716, the DHCP server system 110 compares the lease included in the retrieved record 500 with the DHCPREQUEST message received in step 702. If the terms of the lease continuation are not acceptable to the DHCP server system 110, method 700 continues at step 718 where the DHCP server system 110 returns a DHCPNAK message to the client system 102. Typically, step 718 will be executed when the client system 102 has attempted to change the terms (as part of the DHCPREQUEST message) of the IP address lease.

If the terms of the lease continuation are acceptable to the DHCP server system 110, method 700 continues at step 720. In step 720, the DHCP server system 110 determines if the lease included in the retrieved record 500 has expired. If not, method 700 continues at step 722 where the DHCP server system 110 updates the lease database 316 to indicate that the lease included in the retrieved record 500 has been renewed by the client system 102. Step 722 is followed by step 724 where the DHCP server system 110 sends the client system 102 a DHCPACK message. The DHCPACK message informs the client system 102 that the IP address lease has been renewed.

If the DHCP server 110 determines, in step 720, that the lease included in the retrieved record 500 has expired, method 700 continues at step 726. In step 726, the DHCP server system 110 uses the trusted identifier extracted in step 704 to search the trusted identifier database 318. More specifically, the DHCP server system 110 uses the retrieved trusted identifier to search the trusted identifier index 602 of the trusted identifier database 318. If an entry is found in the trusted identifier index 602 that matches the retrieved trusted identifier, the DHCP server system 110 retrieves the corresponding record 600.

In step 728 the DHCP server system 110 generates a count of IP addresses that are currently leased to the client system 102 associated with the trusted identifier. This is done by counting each IP address lease included in the record 600 retrieved in step 726. If no record was retrieved in step 726, the count is set to zero. The count generated in step 728 is compared, in step 730, to a preset limit. If the count exceeds the preset limit, execution continues at step 732 where a DHCPNAK message is sent by the DHCP server system 110 to the client 102. Execution of step 732 occurs when the DHCP server system 110 determines that the client system 102 has already leased the maximum number of IP address leases that are available to a single client system 102. In this way, client systems 102 are prevented from "hogging" IP address leases.

If step 730 determines that the client system 102 has not exceeded the maximum number of allowed IP address leases, execution of method 700 continues at step 734. In step 734, the DHCP server system 110 updates the lease database 316 to indicate that a new IP address lease has been granted to the client system 102. The lease database 316 is updated by modifying the record retrieved in step 710 to include the terms of the IP address lease granted to the client system. The trusted identifier database 318 is also updated. More specifically, if the trusted identifier database 318 includes a record 600 corresponding to the trusted identifier then the new IP address lease is added to this record 600. In the alternative, the DHCP server system 110 creates a new record 600 and includes the new IP address lease in the new record 600. Step 734 is followed by step 736 where the DHCP server system 110 sends the client system 102 a DHCPACK message. The DHCPACK message informs the client system 102 that the client system 102 has been granted an IP address lease.

Figure 8:
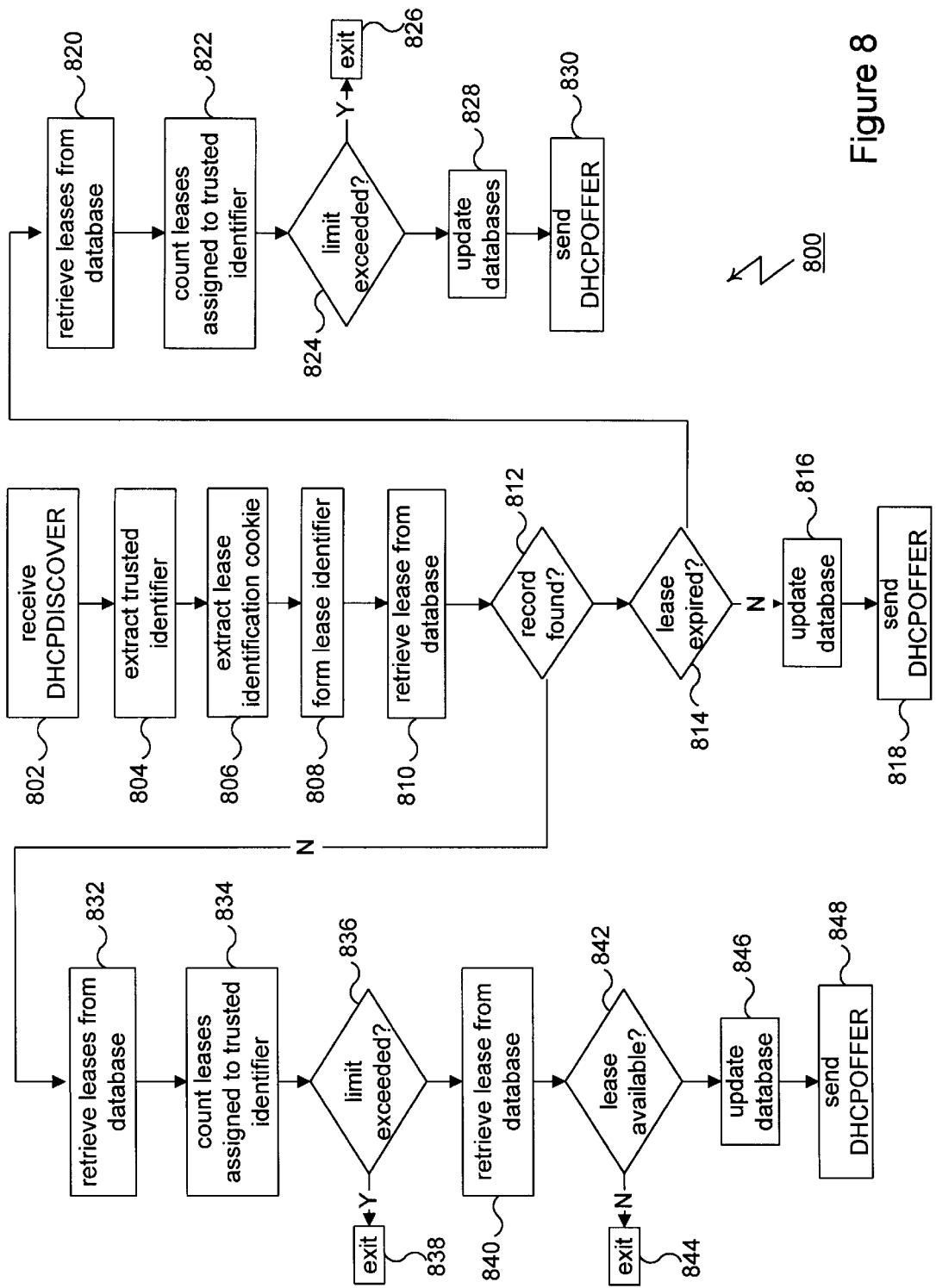
FIG. 8 is a flowchart showing the steps associated with a preferred embodiment of the IP address allocation method of the present invention.

A preferred method for allocation of an IP address by DHCP server system 110 is shown in FIG. 8 and generally designated 800. Method 800 begins with step 802 where DHCP server system 110 receives a broadcast DHCPDISCOVER message from a client system 102. In step 804, the DHCP server system 110 extracts the trusted identifier from the received message. More specifically, and as previously described, each broadcast DHCP message that reaches the DHCP server system 110 includes a trusted identifier. In step 804, this trusted identifier is retrieved, by the DHCP server 110, from the vendor-specific information included in the options field 408 of the received message.

The DHCP protocol allows the client system 102 to include a lease identification cookie in the ciaddr field 404 of each DHCPDISCOVER message for lease renewal. Alternatively, if a lease identification cookie is not included the ciaddr field 404, the DHCP protocol requires that the contents of the chaddr field 406 be used as the lease identification cookie. In step 806, the DHCP server system 110 extracts the lease identification cookie from the ciaddr field 404 or the chaddr field 406 of the received message.

In step 808 the trusted identifier retrieved in step 804 and the lease identification cookie retrieved in step 806 are combined to create a lease identifier. Generally, the combining of the trusted identifier and the lease identification cookie may be performed by a number of techniques including, but not limited to, concatenation. The particular method for combination, must, however be compatible with the method used to generate the entries in the lease identifier index 504 of the lease database 316.

In step 810, the DHCP server system 110 uses the lease identifier generated in step 808 to retrieve a record 500 from lease database 316. More specifically, in step 810, the DHCP server system 110 searches lease identifier index 504 of lease database 316 for an entry that matches the lease identifier generated in step 808. When a matching entry is found, the corresponding record 500 in lease database 316 is retrieved. Alternatively, the search of lease database 316 terminates if no entry in lease identifier index 504 matches the lease identifier. Importantly, the search of lease database 316 using the combination of the trusted identifier and the lease identification cookie ensures that each client system 102 may only retrieve records 500 that are associated with the client system 102. Thus, client systems 102 may only access their own leases, regardless of the lease identification cookie included in the DHCPDISCOVER message received in step 802.

Step 810 is followed by step 812 where the DHCP server system 110 analyzes the results of the search of lease database 316. If step 812 determines that the search of lease database 316 located a record 500, execution of method 800 continues at step 814. In step 814, the DHCP server system 110 determines if the lease included in the retrieved record 500 has expired. If not, method 800 continues at step 816 where the DHCP server system 110 updates the lease database 316 to indicate that the lease included in the retrieved record 500 has been allocated to the client system 102. Preferably, the retrieved record 500 is updated by the DHCP server 110 to limit the IP address lease allocated to the client system 102 to a relatively short duration. The relatively short duration holds the IP address lease for the client system 102 and grants the client system 102 a limited opportunity to extend the IP address lease using a subsequent DHCPREQUEST message. Step 816 is followed by step 818 where the DHCP server system 110 sends the client system 102 a DHCPOFFER message. The DHCPOFFER message informs the client system 102 that the client system 102 may confirm the IP address lease using a subsequent DHCPREQUEST message.

If the DHCP server 110 determines, in step 814, that the lease included in the retrieved record 500 has expired, method 800 continues at step 820. In step 820, the DHCP server system 110 uses the trusted identifier extracted in step 804 to search the trusted identifier database 318. More specifically, the DHCP server system 110 uses the retrieved trusted identifier to search the trusted identifier index 602 of the trusted identifier database 318. If an entry is found in the trusted identifier index 602 that matches the retrieved trusted identifier, the DHCP server system 110 retrieves the corresponding record 600.

In step 822 the DHCP server system 110 generates a count of IP addresses that are currently leased to the client system 102 associated with the trusted identifier. This is done by counting each IP address lease included in the record 600 retrieved in step 820. If no record was retrieved in step 822, the count is set to zero. The count generated in step 822 is compared, in step 824, to a preset limit. If the count exceeds the preset limit, execution of method 800 ends at step 826. Method 800 reaches step 826 when the DHCP server system 110 determines that the client system 102 has already leased the maximum number of IP address leases that are available to a single client system 102. In this way, client systems 102 are prevented from "hogging" IP address leases.

If step 824 determines that the client system 102 has not exceeded the maximum number of allowed IP address leases, execution of method 800 continues at step 828. In step 828, the DHCP server system 110 updates the lease database 316 to indicate that the lease included in the retrieved record 500 has been allocated to the client system 102. Preferably, the retrieved record 500 is updated by the DHCP server 110 to limit the IP address lease allocated to the client system 102 to a relatively short duration. The relatively short duration holds the IP address lease for the client system 102 and grants the client system 102 a limited opportunity to extend the IP address lease using a subsequent DHCPREQUEST message. The DHCP server system 110 also updates the trusted identifier database 318 in step 828. More specifically, if the trusted identifier database 318 includes a record 600 corresponding to the trusted identifier then the new IP address lease is added to this record 600. In the alternative, the DHCP server system 110 creates a new record 600 and includes the new IP address lease in the new record 600.

Step 828 is followed by step 830 where the DHCP server system 110 sends the client system 102 a DHCPOFFER message. The DHCPOFFER message informs the client system 102 that the client system 102 may confirm the IP address lease using a subsequent DHCPREQUEST message.

If the DHCP server 110 determines, in step 812, that the search of lease database 316 ended without finding a record 500, method 800 continues at step 832. In step 832, the DHCP server system 110 uses the trusted identifier extracted in step 804 to search the trusted identifier database 318. More specifically, the DHCP server system 110 uses the retrieved trusted identifier to search the trusted identifier index 602 of the trusted identifier database 318. If an entry is found in the trusted identifier index 602 that matches the retrieved trusted identifier, the DHCP server system 110 retrieves the corresponding record 600.

In step 834 the DHCP server system 110 generates a count of IP addresses that are currently leased to the client system 102 associated with the trusted identifier. This is done by counting each IP address lease included in the record 600 retrieved in step 820. If no record was retrieved in step 832, the count is set to zero. The count generated in step 834 is compared, in step 836, to a preset limit. If the count exceeds the preset limit, execution of method 800 ends at step 838. Method 800 reaches step 838 when the DHCP server system 110 determines that the client system 102 has already leased the maximum number of IP address leases that are available to a single client system 102. In this way, client systems 102 are prevented from "hogging" IP address leases.

If step 836 determines that the client system 102 has not exceeded the maximum number of allowed IP address leases, execution of method 800 continues at step 840. In step 840, the DHCP server system 110 searches the lease database 316 for records 500 that include IP address that are available for allocation. Generally, this search is performed by using IP address index 502. In step 842, the DHCP server system 110 analyzes the results of the search of step 840. If a record 500 including an IP address lease available for allocation was not located in step 840, method 800 terminates at step 844. Method 800 reaches step 844 when all available IP address have been allocated to client systems 102.

In the alternative, if DHCP server system 110 determines, in step 842, that a record 500 including an IP address lease available for allocation was located in step 840, method 800 continues at step 846. In step 846, the DHCP server system 110 updates the lease database 316 to indicate that the lease included in the record 500 retrieved in step 840 has been allocated to the client system 102. Preferably, the retrieved record 500 is updated by the DHCP server 110 to limit the IP address lease allocated to the client system 102 to a relatively short duration. The relatively short duration holds the IP address lease for the client system 102 and grants the client system 102 a limited opportunity to extend the IP address lease using a subsequent DHCPREQUEST message. The DHCP server system 110 also updates the trusted identifier database 318 in step 846. More specifically, if the trusted identifier database 318 includes a record 600 corresponding to the trusted identifier then the new IP address lease is added to this record 600. In the alternative, the DHCP server system 110 creates a new record 600 and includes the new IP address lease in the new record 600.

Step 846 is followed by step 848 where the DHCP server system 110 sends the client system 102 a DHCPOFFER message. The DHCPOFFER message informs the client system 102 that the client system 102 may confirm the IP address lease using a subsequent DHCPREQUEST message.

Figure 9:
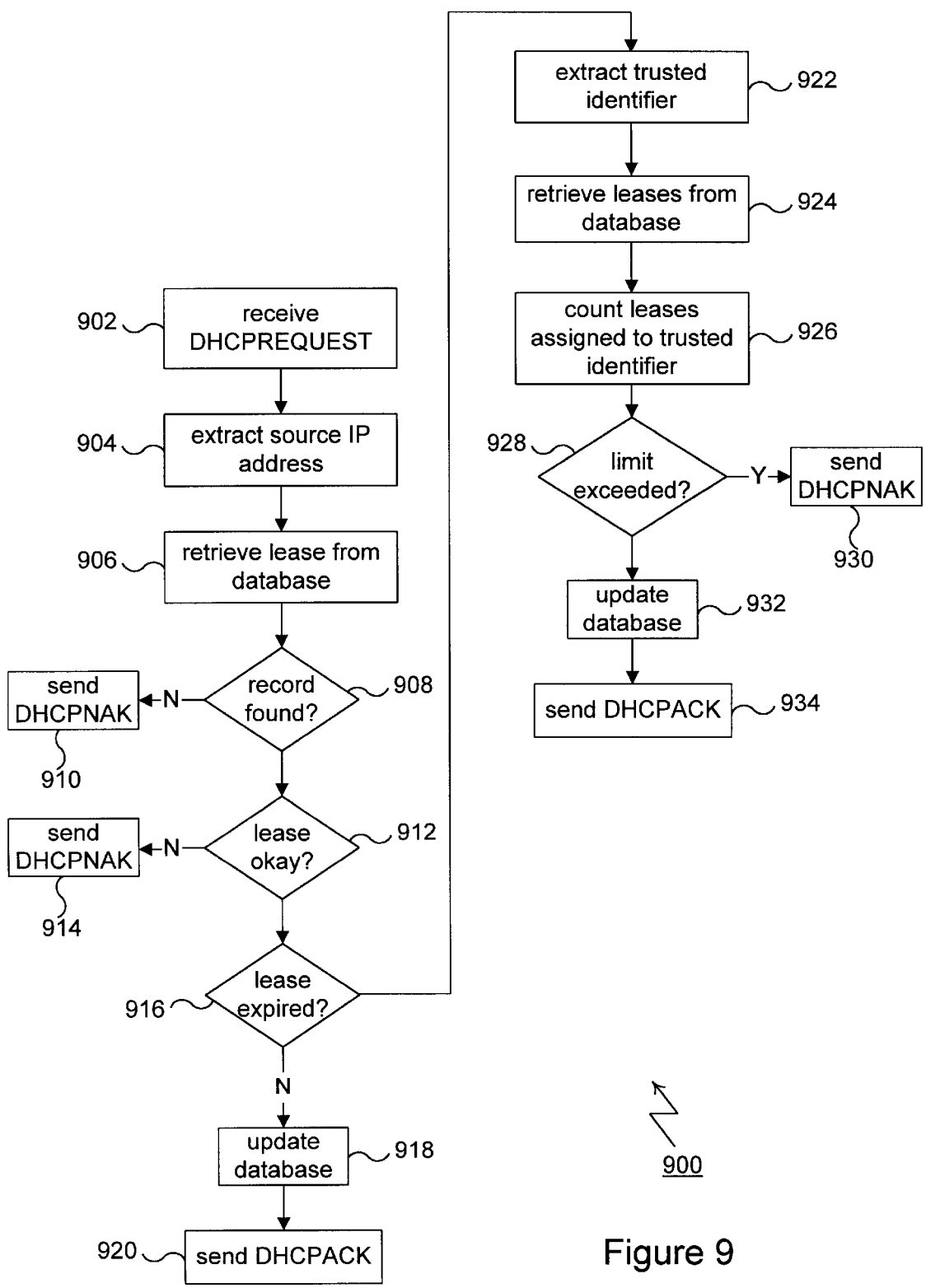
FIG. 9 is a flowchart showing the steps associated with a second preferred embodiment of the IP address lease renewal method of the present invention.

A second preferred method for renewal of an IP address lease by DHCP server system 110 is shown in FIG. 9 and generally designated 900. Method 900 begins with step 902 where DHCP server system 110 receives a unicast DHCPREQUEST message from a client system 102. For the purposes of the present invention, the fact that the received message is a unicast message indicates that the message is, by necessity, a request for renewal of an existing lease.

In step 904, the DHCP server system 110 extracts an IP source address from the header of the IP packet (or packets) that makes up the received message. Importantly, and as discussed previously, the secure IP relay agent ensures the correctness of source addresses included in IP packet headers. As a result, the DHCP server system 110 may assume that the IP source address extracted in step 904 is actually the IP address of the client system 102 sending the DHCPREQUEST message received in step 902.

In step 906, the DHCP server system 110 uses the IP address extracted in step 904 to retrieve a record 500 from lease database 316. More specifically, in step 906, the DHCP server system 110 searches the IP address index 502 of lease database 316 for an entry that matches the extracted IP address. When a matching entry is found, the corresponding record 500 in lease database 316 is retrieved.

Step 906 is followed by step 908 where the DHCP server system 110 analyzes the results of the search of lease database 316. If step 908 determines that the search of lease database 316 terminated without locating a record 500, execution of method 800 continues at step 910. In step 910, a DHCPNAK message is sent by the DHCP server system 110 to the client system 102 indicating that the DHCP server system 110 was unable to comply with the request to extend the IP address lease of the client system 102. Typically, step 910 will be executed when the client system 102 has attempted to extend a non-existent or otherwise invalid IP address lease.

If step 908 determines that the search of lease database 316 located a record 500, execution of method 800 continues at step 912. In step 912, the DHCP server system 110 compares the lease included in the retrieved record 500 with the DHCPREQUEST message received in step 902. If the terms of the lease continuation are not acceptable to the DHCP server system 110, method 900 continues at step 914 where the DHCP server system 110 returns a DHCPNAK message to the client system 102. Typically, step 914 will be executed when the client system 102 has attempted to change the terms (as part of the DHCPREQUEST message) of the IP address lease.

If the terms of the lease continuation are acceptable to the DHCP server system 110, method 900 continues at step 916. In step 916, the DHCP server system 110 determines if the lease included in the retrieved record 500 has expired. If not, method 900 continues at step 918 where the DHCP server system 110 updates the lease database 316 to indicate that the lease included in the retrieved record 500 has been renewed by the client system 102. Step 918 is followed by step 920 where the DHCP server system 110 sends the client system 102 a DHCPACK message. The DHCPACK message informs the client system 102 that the IP address lease has been renewed.

If the DHCP server 110 determines, in step 912, that the lease included in the retrieved record 500 has expired, method 900 continues at step 922. In step 922, the DHCP server system 110 extracts the trusted identifier from index 504 of the retrieved record 500.

In step 924, the DHCP server system 110 uses the trusted identifier extracted in step 922 to search the trusted identifier database 318. More specifically, the DHCP server system 110 uses the retrieved trusted identifier to search the trusted identifier index 602 of the trusted identifier database 318. If an entry is found in the trusted identifier index 602 that matches the retrieved trusted identifier, the DHCP server system 110 retrieves the corresponding record 600.

In step 926 the DHCP server system 110 generates a count of IP addresses that are currently leased to the client system 102 associated with the trusted identifier. This is done by counting each IP address lease included in the record 600 retrieved in step 924. If no record was retrieved in step 924, the count is set to zero. The count generated in step 926 is compared, in step 928, to a preset limit. If the count exceeds the preset limit, execution continues at step 930 where a DHCPNAK message is sent by the DHCP server system 110 to the client 102. Execution of step 930 occurs when the DHCP server system 110 determines that the client system 102 has already leased the maximum number of IP address leases that are available to a single client system 102. In this way, client systems 102 are prevented from "hogging" IP address leases.

If step 928 determines that the client system 102 has not exceeded the maximum number of allowed IP address leases, execution of method 900 continues at step 932. In step 932, the DHCP server system 110 updates the lease database 316 to indicate that a new IP address lease has been granted to the client system 102. The lease database 316 is updated by modifying the record retrieved in step 906 to include the terms of the IP address lease granted to the client system. The trusted identifier database 318 is also updated. More specifically, if the trusted identifier database 318 includes a record 600 corresponding to the trusted identifier then the new IP address lease is added to this record 600. In the alternative, the DHCP server system 110 creates a new record 600 and includes the new IP address lease in the new record 600. Step 932 is followed by step 934 where the DHCP server system 110 sends the client system 102 a DHCPACK message. The DHCPACK message informs the client system 102 that the client system 102 has been granted an IP address lease.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for allocating an IP address that comprises the steps, performed by a server system, of:
 receiving a message from a client system, the message requesting allocation of an IP address, the message including a trusted identifier with the trusted identifier being an object that cannot be forged by the client system;
 extracting the trusted identifier from the message;
 counting the number of IP addresses allocated to the trusted identifier; and
 allocating an IP address for the client system if the number of IP addresses allocated to the trusted identifier is less than a predetermined limit.

2. A method as recited in claim 1 wherein the message is a broadcast DHCPREQUEST message.

3. A method for allocating an IP address that comprises the steps, performed by a server system, of:
 receiving a message from a client system, the message requesting allocation of an IP address, the message including a trusted identifier with the trusted identifier being an object that cannot be forged by the client system;
 forming a lease identifier using the trusted identifier included in the message;
 determining if the lease identifier has an associated IP address lease; and
 allocating, if the lease identifier has an associated IP address lease, an IP address for the client system in accordance with the IP address lease associated with the lease identifier.

4. A method as recited in claim 3 wherein the message is a broadcast DHCPREQUEST message.

5. A method as recited in claim 3 wherein the message includes a lease identification cookie and wherein the lease identifier is formed by combining the trusted identifier and the lease identification cookie.

6. A method for allocating an IP address that comprises the steps, performed by a server system, of:
 receiving a message from a client system, the message requesting allocation of an IP address, the message including a source address with the validity of the source address being ensured by the secure relay agent;
 extracting the source address from the message;
 retrieving an IP address lease associated with the source address; and
 allocating an IP address for the client system in accordance with the IP address lease.

7. A method as recited in claim 6 wherein the message is a unicast DHCPREQUEST message.

8. A computer program product including:
 a computer usable medium having computer readable code embodied therein for allocating IP addresses in a computer network that includes one or more client systems, each client system having an associated trusted identifier with the trusted identifier being an object that cannot be forged by the client system, the computer program product comprising:
 first computer readable program code devices configured to cause a computer system to receive a message from a client system, the message requesting allocation of an IP address, the message including the trusted identifier of the client system sending the message;
 second computer readable program code devices configured to cause a computer system to extract the trusted identifier from the message;
 third computer readable program code devices configured to cause a computer system to count the number of IP addresses allocated to the trusted identifier; and
 fourth computer readable program code devices configured to cause a computer system to allocate an IP address for the client system if the number of IP addresses allocated to the trusted identifier is less than a predetermined limit.

9. A computer program product as recited in claim 8 wherein the message is a broadcast DHCPREQUEST message.

10. A computer program product including:
 a computer usable medium having computer readable code embodied therein for allocating IP addresses in a computer network that includes one or more client systems, each client system having an associated trusted identifier with the trusted identifier being an object that cannot be forged by the client system, the computer program product comprising:

first computer readable program code devices configured to cause a computer system to receive a message from a client system, the message requesting allocation of an IP address, the message including a trusted identifier with the trusted identifier being an object that cannot be forged by the client system;

second computer readable program code devices configured to cause a computer system to form a lease identifier using the trusted identifier included in the message;

third computer readable program code devices configured to cause a computer system to determine if the lease identifier has an associated IP address lease; and fourth computer readable program code devices configured to cause a computer system to allocate, if the lease identifier has an associated IP address lease, an IP address for the client system in accordance with the IP address lease associated with the lease identifier.

11. A computer program product as recited in claim 10 wherein the message is a broadcast DHCPREQUEST message.

12. A computer program product as recited in claim 10 wherein the message includes a lease identification cookie and wherein the lease identifier is formed by combining the trusted identifier and the lease identification cookie.

13. A computer program product including:

a computer usable medium having computer readable code embodied therein for allocating IP addresses in a computer network that includes one or more client systems, each client system having an associated trusted identifier with the trusted identifier being an object that cannot be forged by the client system, the computer program product comprising:

first computer readable program code devices configured to cause a computer system to receive a message from a client system, the message requesting allocation of an IP address, the message including a source address with the validity of the source address being ensured by the secure relay agent;

second computer readable program code devices configured to cause a computer system to extract the source address from the message;

third computer readable program code devices configured to cause a computer system to retrieve an IP address lease associated with the source address; and fourth computer readable program code devices configured to cause a computer system to allocate an IP address for the client system in accordance with the IP address lease.

14. A computer program product as recited in claim 13 wherein the message is a unicast DHCPREQUEST message.

15. An apparatus for allocating IP addresses in a computer network that includes one or more client systems, each client system having an associated trusted identifier with the trusted identifier being an object that cannot be forged by the client system, the computer program product apparatus:

a first portion configured to allow a computer system to receive a message from a client system, the message requesting allocation of an IP address, the message including the trusted identifier of the client system sending the message;

a second portion configured to cause a computer system to extract the trusted identifier from the message;

a third portion configured to cause a computer system to count the number of IP addresses allocated to the trusted identifier; and a fourth portion configured to cause a computer system to allocate an IP address for the client system if the number of IP addresses allocated to the trusted identifier is less than a predetermined limit.

16. An apparatus as recited in claim 15 wherein the message is a broadcast DHCPREQUEST message.

17. An apparatus for allocating IP addresses in a computer network that includes one or more client systems, each client system having an associated trusted identifier with the trusted identifier being an object that cannot be forged by the client system, the computer program product apparatus:

a first portion configured to allow a computer system to receive a message from a client system, the message requesting allocation of an IP address, the message including a trusted identifier with the trusted identifier being an object that cannot be forged by the client system;

a second portion configured to cause a computer system to form a lease identifier using the trusted identifier included in the message;

a third portion configured to cause a computer system to determine if the lease identifier has an associated IP address lease; and a fourth portion configured to cause a computer system to allocate, if the lease identifier has an associated IP address lease, an IP address for the client system in accordance with the IP address lease associated with the lease identifier.

18. An apparatus as recited in claim 17 wherein the message is a broadcast DHCPREQUEST message.

19. An apparatus as recited in claim 17 wherein the message includes a lease identification cookie and wherein the lease identifier is formed by combining the trusted identifier and the lease identification cookie.

20. An apparatus for allocating IP addresses in a computer network that includes one or more client systems:

a first portion configured to allow a computer system to receive a message from a client system, the message requesting allocation of an IP address, the message including a source address with the validity of the source address being ensured by the secure relay agent;

a second portion configured to cause a computer system to extract the source address from the message;

a third portion configured to cause a computer system to retrieve an IP address lease associated with the source address; and a fourth portion configured to cause a computer system to allocate an IP address for the client system in accordance with the IP address lease.

21. An apparatus as recited in claim 20 wherein the message is a unicast DHCPREQUEST message.

* * * * *